United States Patent
Mancuso

[11] Patent Number: 5,962,982
[45] Date of Patent: Oct. 5, 1999

[54] REMOTE POSITIONABLE PHOTOCELL DEVICE FOR USE WITH AN EXTERIOR LANDSCAPE LIGHTING ASSEMBLY

[76] Inventor: Michael L. Mancuso, 1439 Vanstone Dr., Milford, Mich. 48382

[21] Appl. No.: 09/099,559

[22] Filed: Jun. 18, 1998

[51] Int. Cl.$^6$ .................................................. H05B 37/02
[52] U.S. Cl. .......................... 315/159; 315/316; 315/324; 250/205
[58] Field of Search ................................... 315/156, 158, 315/159, 292, 324, 316; 250/205

[56] References Cited

U.S. PATENT DOCUMENTS

| | | | |
|---|---|---|---|
| D. 314,833 | 2/1991 | Beachy et al. | D26/68 |
| D. 315,030 | 2/1991 | Jacobs et al. | D26/63 |
| 1,788,111 | 1/1931 | Knowles . | |
| 3,235,771 | 2/1966 | Schwartz | 315/159 |
| 3,250,951 | 5/1966 | Tabet | 315/159 |
| 3,428,861 | 2/1969 | Zinsmeyer | 315/159 |
| 3,621,269 | 11/1971 | Misencik | 250/227 |
| 3,636,357 | 1/1972 | Del Zotto | 315/159 |
| 3,935,505 | 1/1976 | Spiteri | 315/158 |
| 4,451,763 | 5/1984 | Sodini | 315/159 |
| 4,733,103 | 3/1988 | Itoh et al. | 307/117 |
| 4,774,648 | 9/1988 | Kakuk et al. | 362/302 |
| 4,833,368 | 5/1989 | Lin | 315/150 |
| 4,870,548 | 9/1989 | Beachy et al. | 362/145 |
| 4,991,054 | 2/1991 | Walters | 315/159 |
| 5,001,611 | 3/1991 | Beachy et al. | 362/145 |
| 5,225,961 | 7/1993 | Zander et al. | 361/641 |
| 5,285,349 | 2/1994 | Zander et al. | 315/159 |
| 5,325,023 | 6/1994 | Martich | 315/159 |
| 5,421,078 | 6/1995 | Zander et al. | 29/602.1 |
| 5,446,343 | 8/1995 | Shulman | 315/156 |
| 5,637,964 | 6/1997 | Hakkarainen | 315/158 |
| 5,670,846 | 9/1997 | Hollaway | 315/151 |
| 5,789,868 | 8/1998 | Sears | 315/159 |

OTHER PUBLICATIONS

Intermatic Brochure—Outdoor Lighting Timer Brochure on Malibu Plug–in Power Pack Brochure on Malibu Remote Photo Control All dated 1 year prior to applicant's invention.
Vista Brochure on Transformers Vista Professional Outdoor Lighting—Brochure (Night Guard Series) Power Centers & IQ Controller—Brochure First Alert Brochure—Automatic Outdoor Light Timer All dated 1 year prior to Applicant's invention.

*Primary Examiner*—Michael B Shingleton
*Attorney, Agent, or Firm*—Gifford, Krass, Groh, Sprinkle, Anderson & Citkowski, P.C.

[57] ABSTRACT

A photocell device for use with an exterior landscape lighting assembly. The lighting assembly includes a transformer having an input line connected to an electrical power source. The transformer converts a primary electrical voltage to a secondary electrical voltage which is in turn outputted through an output line connecting to a plurality of individual lighting units. The photocell device includes a turf stake capable of engaging into a ground location. An enclosure is mounted atop the turf stake and includes a power supply circuit, a photo sensor and control circuitry communicating with the photo sensor. The power supply circuit converts the secondary transformer output to an unregulated and filtered direct current suitable for powering the control circuitry. The control circuitry interfaces with the photo sensor and, in response thereto, selectively activates and deactivates the plurality of lighting elements. The control circuitry further includes such features as timer and dimmer capability and also may include software algorithmic capability for approximating a real time input signal and operating the lighting units responsive to the input signal.

6 Claims, 7 Drawing Sheets

REMOTE POSITIONABLE PHOTOCELL DEVICE FOR USE WITH AN EXTERIOR LANDSCAPE LIGHTING ASSEMBLY

BACKGROUND OF THE INVENTION

1. Field of the Invention

The present invention relates generally to exterior landscape lighting assemblies having a specified form of photocell control and, more particularly, to a remote positionable photocell device capable of being located a spaced distance from a transformer and further capable of providing a unique array of photocell controls to a plurality of exterior lights.

2. Description of the Prior Art

The prior art is well documented with outdoor landscaping lighting assemblies and, particularly, lighting assemblies which utilize some form of photocell control for activating and deactivating the outdoor lighting based upon day and night conditions. Generally all low-voltage landscape lighting systems are powered by 12 volts (V) alternating current (AC) by means of a transformer which converts an AC household power input (typically 120 V AC) to the 12 Volts AC suitable for this type of lighting. The transformer is a necessary component owing to the power input specifications of the various lighting elements which make up the landscaping lighting assembly.

Establishing on/off control of landscape lighting systems has traditionally been accomplished in a number of different ways, these including installing a timer on the primary winding of the transformer. The shortcoming however with simple timer assemblies is that they require frequent readjustment, particularly following power outages and changes of seasons and further that the transformer must be located in an area accessible to the user in order to make the necessary adjustments.

Other types of prior art assemblies include installing a photocell on the exterior of the transformer case and communicated with the primary winding of the transformer. In this variant, the transformer must be mounted on the exterior wall of the home or structure around which is surrounded the lighting assembly. The transformer must be conspicuously located near an available exterior covered ground fault interrupted outlet where the photocell is exposed to natural light (preferably a Northern exposure) and without direct exposure to street lights, porch lights, car headlights and other lights which are directly controlled by the transformer. The drawback of this variant is that most homeowners do not desire having the transformer or any other device located on the exterior of their home in an exposed position. Also, the availability of a suitable outlet at the necessary location for proper functioning of the photocell is likewise often a problem.

SUMMARY OF THE PRESENT INVENTION

The present invention is a photocell device for use with an exterior landscape lighting assembly which overcomes the shortcomings of the prior art by providing the photocell device as a separably positionable unit apart from the transformer and on its secondary side which permits the device to be mounted at any suitable outdoor location for selectively activating and deactivating a plurality of lighting units. By separating the photocell device from the transformer, the transformer may be located anywhere without consideration to sunlight access or timer accessibility. In most instances, this means that the transformer need no longer be located externally of the residence or other structure around which the lighting elements are located.

The photocell device includes a turf stake capable of being engaged into a ground location and an enclosure unit mounted atop the turf stake. The enclosure unit includes a power supply circuit, a photo sensor element and control circuitry operatively communicating with the photo sensor. The control circuitry includes such elements as a light sensor, schmitt trigger, and load break. Algorithmic software circuitry may also be incorporated into the control circuitry for the purpose of receiving internally programmed or externally transmitted real time signals, such as by means of a suitable antenna, and for activating and deactivating the load to be sent to the lighting units.

The power supply circuit converts the secondary load of the transformer into an unregulated and filtered direct current suitable for powering the control circuitry. The control circuitry, in response to receiving an appropriate input from the photosensor, selectively activates the lighting units and the duration and intensity of the load may further be established by such additional features as timer circuitry and dimmer/brightness circuitry.

In a preferred embodiment, a clear rod extends upwardly from the electrical enclosure unit and functions as a light conduit for transmitting ambient light to the photo sensor which is mounted in the electrical enclosure directly below the clear rod access hole.

In a further preferred embodiment, the enclosure unit which includes the photo sensor and associated circuitry also includes an open or transparent covering over the photo sensor and which is formed on a selected face.

BRIEF DESCRIPTION OF THE DRAWINGS

Reference will now be made to the attached drawings, when read in combination with the following specification, wherein like reference numerals refer to like parts throughout the several views, and in which.

DETAILED DESCRIPTION OF THE PREFERRED EMBODIMENTS

Figure 1:
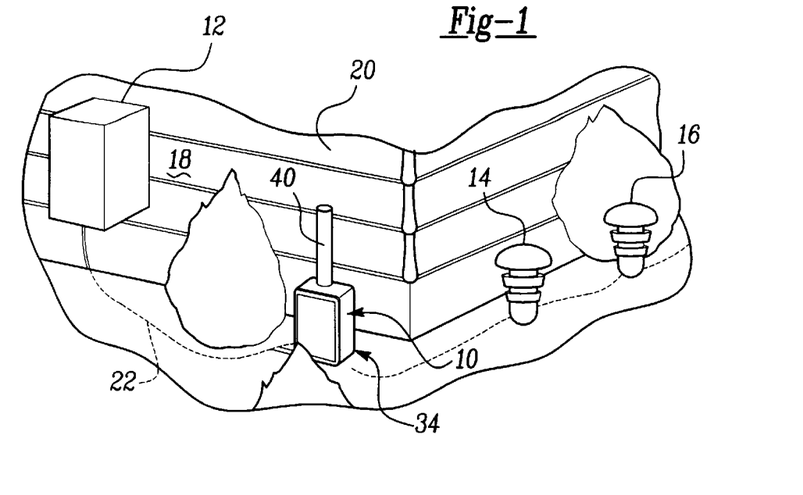
FIG. 1 is an environmental view in perspective of the photocell device for use with an exterior lighting assembly according to a preferred embodiment of the present invention.

Referring now to FIG. 1, an environmental view is shown of a photocell device 10 for use with an outdoor lighting assembly according to a preferred embodiment of the present invention. The photocell device 10 is illustrated in use with an electrical transformer 12, a first outdoor lighting unit 14 and a second outdoor lighting 16 unit. The transformer 12 is illustrated placed upon an exterior facing surface of an outside wall 18 of a structure 20 however, as explained in the preceding summary of the invention, the provision of the photocell device 10 with integral circuitry enables the transformer 12 to be mounted at any location inside or out of the structure 20 without consideration to sunlight access or timer accessibility. As is also known, the transformer 12 functions to convert an input power source from a primary electrical load (typically 120 Volt AC household power) to a stepped down 12 Volts AC suitable for most types of conventional outdoor lighting assemblies. The transformer 12 also includes an input line (not shown) connected to the electrical power source and an output line, illustrated at 22. The photocell device 10 communicates with the output line 22 of the transformer 12 at any desired point between the transformer 12 and a first of the lighting units 14 and 16.

Figures 2, 3:
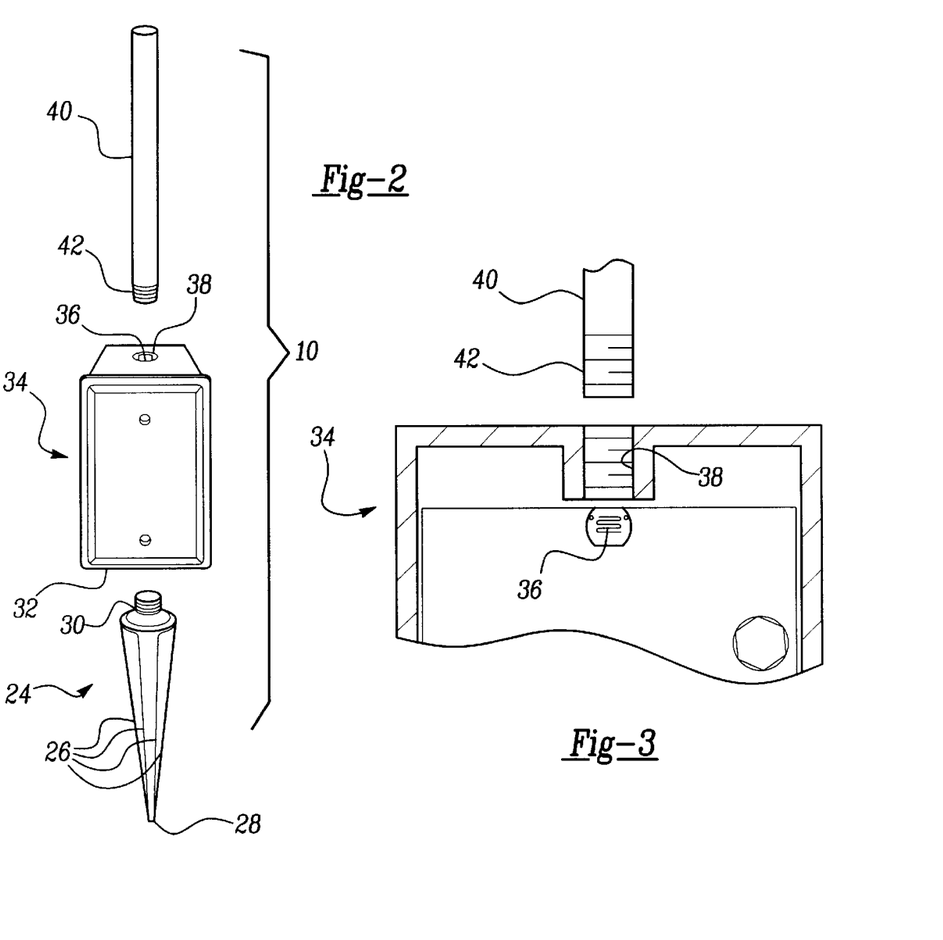
FIG. 2 is an is an exploded view of the photocell device illustrated in FIG. 1 and according to the present invention.
FIG. 3 is an enlarged view in cutaway of the clear rod extending upwardly from the electrical enclosure unit and in proximity to the photo sensor element according to the present invention.

Referring again to FIG. 1 and also to FIG. 2, the photocell device 10 is again shown and includes a turf stake 24 which, as is best shown in FIG. 1, is capable of being engaged into a ground location. The turf stake 24 can be of any desired construction but, as is illustrated, preferably includes a plurality of downwardly and tapering projections 26 which narrow to a point 28. Located at a top end of the stake 24 opposite the point 28 is an externally threaded screw projection 30 which is capable of being threadably engaged into a corresponding internally threaded recess 32 located on a bottom face of an enclosure unit 34.

Referring again to FIG. 2 and also to FIG. 3, the enclosure unit 34 is generally rectangular shaped and includes an interior cavity for receiving control circuitry for operating the device 10, as will be subsequently described in more detail. Located proximate a top of the enclosure unit 34 is a photo sensor element 36, such an element by itself being according to a construction known in the art for signaling changes in light correlating to daytime and nighttime periods. The photo sensor element 36 is mounted in proximity to an aperture in the top face of the enclosure unit 34, the aperture being defined by an interiorly recessed threaded wall 38.

An elongate and transparent rod 40 is provided and includes a downwardly extending and exteriorly threaded end 42 which is threadably interengaged with the interiorly recessed and threaded wall 38 of the enclosure unit 34. The function of the transparent rod 40 is to gather light from all directions surrounding the photocell device 10 once it is implanted into the ground, this enhanced ability to gather light making the placement and orientation of the device less critical than other prior art designs. The rod 40 acts as a light conduit to transmit ambient light to the photo sensor 36 mounted in the electrical enclosure 34 directly below the aperture formed by the recessed threaded wall 38. Advantages of the elongate and transparent rod 40 include the ability to extend above anticipated height of snow accumulation, thus keeping the enclosure low to the ground and out of plain sight. The very small horizontal surface area of the rod 40 also serves to prevent leaves and other yard debris from accumulating and obstructing ambient light from reaching the photo sensor. The rod 40 may also serve to calibrate the photo sensor 36 by applying paint or black electrical tape to cover a specified circular area of the rod 40.

Figure 4:
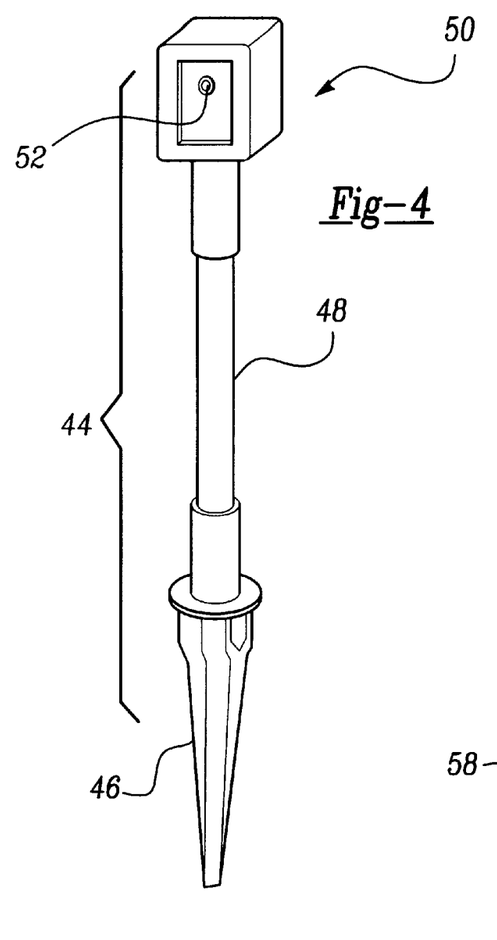
FIG. 4 is a perspective view of a photocell device according to a further preferred embodiment of the present invention.
Figure 5:
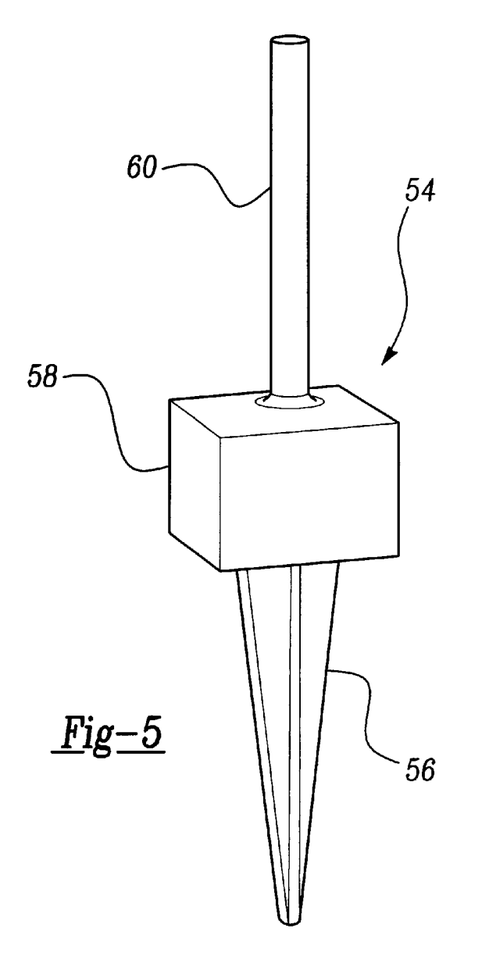
FIG. 5 is a perspective view of a photocell device according to a yet further preferred embodiment of the present invention.

Referring to FIGS. 4 and 5, additional variants of photocell devices are illustrated at 44 and 54, respectively. Addressing first the variant of FIG. 4, the photocell device 44 includes a turf engaging stake 46, an upwardly extending stem portion 48 and an enclosure unit 50 mounted atop the stem portion 48. A photo sensor element 52 is positioned upon a forward face of the enclosure unit 50 and, upon proper orientation of the photocell device 44 in a suitable outdoor location, gauges the degree of available light. Referring further to the variant of FIG. 5, the photocell device 54 includes again a turf stake 56, an enclosure unit 58 integrally formed with the turf stake 56, and an elongate and transparent rod 60 (same as illustrated at 40 in FIGS. 1–3) which threadably engages with the enclosure unit 58 and which is arranged proximate to a photo sensor element (not shown) which is arrayed within the unit 58 underneath the connection with the rod 60. Aside from their differences in construction, the photocell devices 44 and 54 operate in identical fashion with the photocell device 10 illustrated in FIGS. 1–3 and each further includes appropriate input and output lines to interconnect with the transformer output line 22 such as is shown by the device 10 in FIG. 1.

Figure 6:
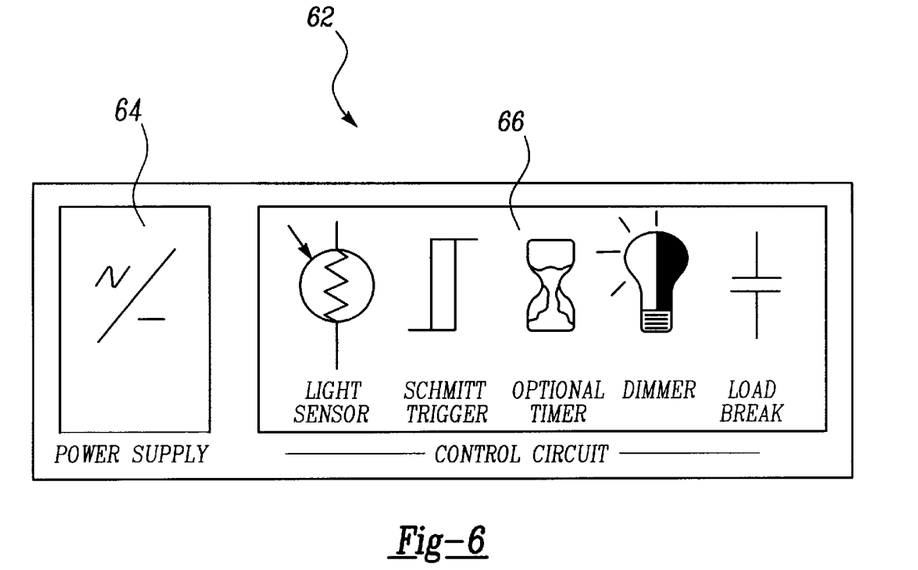
FIG. 6 is a view of a menu display for the photocell device which references the power supply and control circuitry according to the present invention.

Referring now to FIG. 6, a menu display is illustrated at 62 which illustrates the basic operating components of the control circuitry incorporated within the enclosure unit of the photocell device. The menu display includes a power supply indicating touch pad 64 for turning the unit off and on. A second control circuit touch pad is illustrated at 66 and controls such circuitry functions as the light sensor for measuring levels of light and for activating a specified electrical load, a schmitt trigger for introducing a dead band into the light control circuit and for preventing the circuit from rapidly turning on and off as a result of only minor changes in light level (line chatter), optional timer and dimmer circuits and, finally, a load control/breaker circuit for providing power to the load relay and transient voltage protection to the control circuitry. A more detailed explanation of operation of the control circuitry of the photocell device of the present invention will be had with reference now to the various schematic views of FIGS. 7–11.

Figure 7:
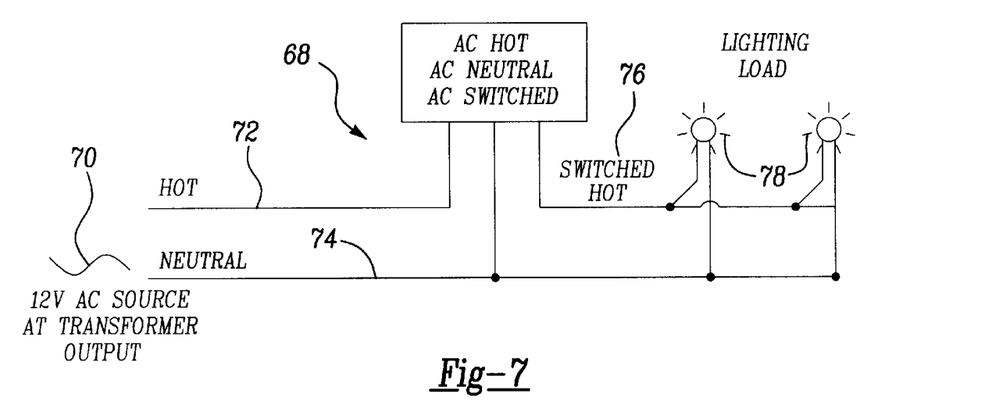
FIG. 7 is a schematic view of load relay switches AC HOT power on and off to control any load connected between AC SWITCHED and AC NEUTRAL positions and according to the control circuitry of the present invention.

Referring to FIG. 7, a schematic view is shown at 68 of the switching array for the transformer output. Specifically, the 12 V AC output of the transformer (indicated at 70) enters the AC HOT and AC NEUTRAL terminals 72 and 74 of the power supply and is converted to an AC SWITCHED load at 76 suitable for illuminating the individual lighting units, illustrated schematically at 78.

Figure 8:
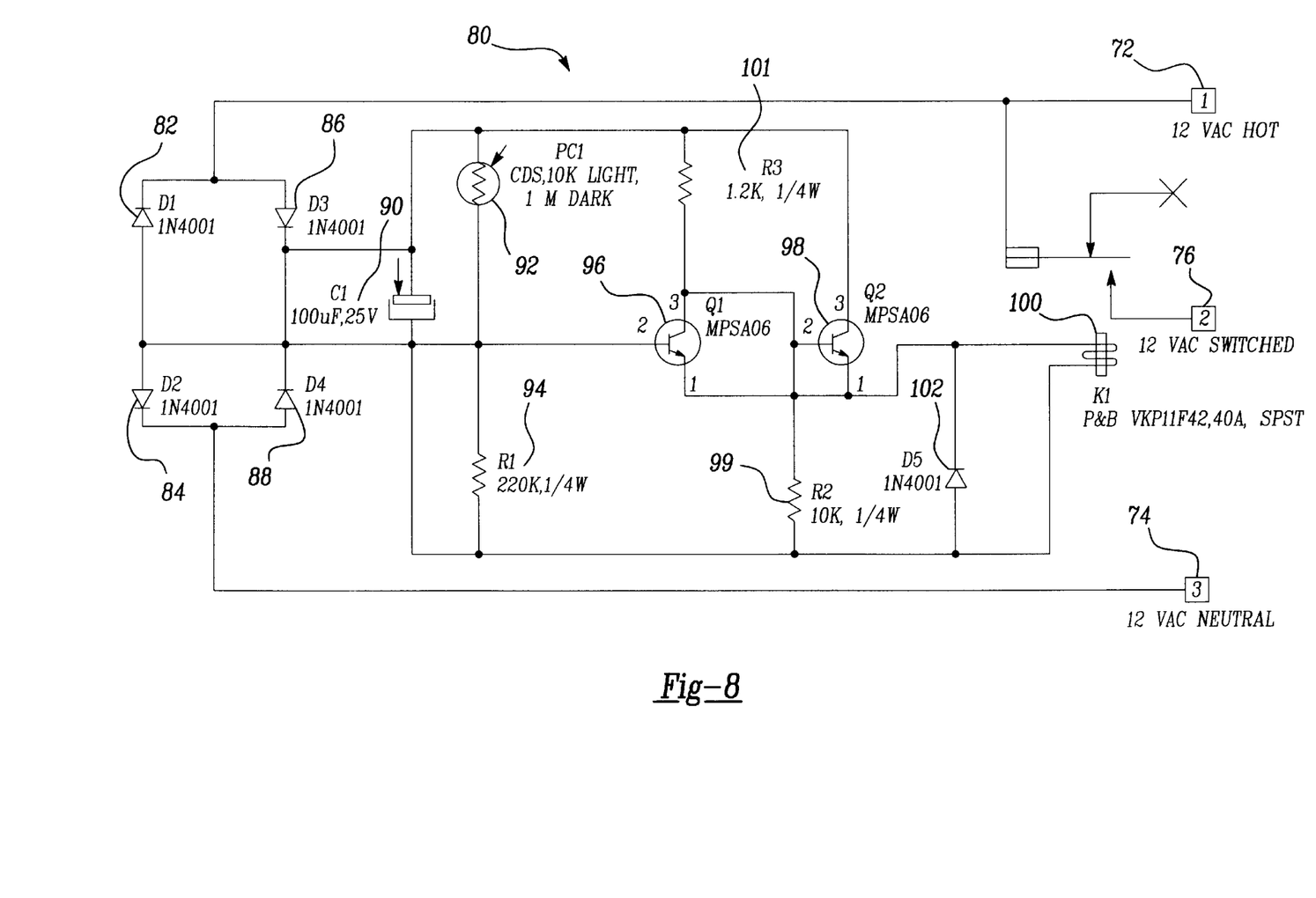
FIG. 8 is a control schematic of the power supply, photocell and control circuitry according to the photocell device of the present invention.

Referring now to FIG. 8, a schematic is illustrated at 80 of the operation of the basic control circuitry of the photocell device according to the present invention. Illustrated at 82, 84, 86 and 88 are first, second, third and fourth diodes in full wave rectifying the incoming 12 V AC signal from the secondary winding or side or terminal of the transformer. A capacitor 90 (ideally set at 100 micro-Farads at 25 Volts) filters the rectified AC signal to develop filtered and unregulated DC which serves as the power supply for the control circuitry.

The photo/light sensor is illustrated as CDS photocell PC1 element 92 and combines with a first resistor 94 to determine a preset light level in which to activate the electrical load either on or off by biasing the base a transistor Q1 96. The schmitt trigger, formed by first transistor Q1 96 and a second transistor Q2 98 as well as a second resistor 100 (preferably 10 K-Ohm at ¼ Watts) and a third resistor 102 (preferably 1.2 K-Ohm at ¼ Watts), functions by introducing a hysterisis to the switching circuit to prevent relay chatter as previously described.

Assuming a predetermined level of darkness is obtained, the first transistor 96 will be biased such that it is off. The base of the second transistor 98 is biased by the voltage divider consisting of the resistors 100 and 102. If the input voltage falls below the switching level of the circuit, the first transistor 96 remains off and the relay on. As the input voltage approaches the calibrated switching voltage, a critical voltage is reached where the first transistor 96 begins to conduct and regeneratively turns off the second transistor 98 and relay 100. If the input voltage is lowered below a second critical level, the second transistor 98 will again conduct, switching the relay 100 on.

A fifth diode 102 is located in proximity to the relay and protects the control circuit by clamping voltage spikes generated by the coil of the relay 100. The relay 100 is appropriately sized to carry the large amount of current supplied by the secondary or load side of the transformer 72. The 12 V AC switched load (for supplying the lighting elements) is again illustrated schematically at 76 in communication with the output of the relay 100. Likewise, the 12 V AC HOT and 12 V AC NEUTRAL inputs are also illustrated again at 72 and 74 in operative communication with the power supply (diode relay 82–88) for supplying the input from the transformer.

Figure 9:
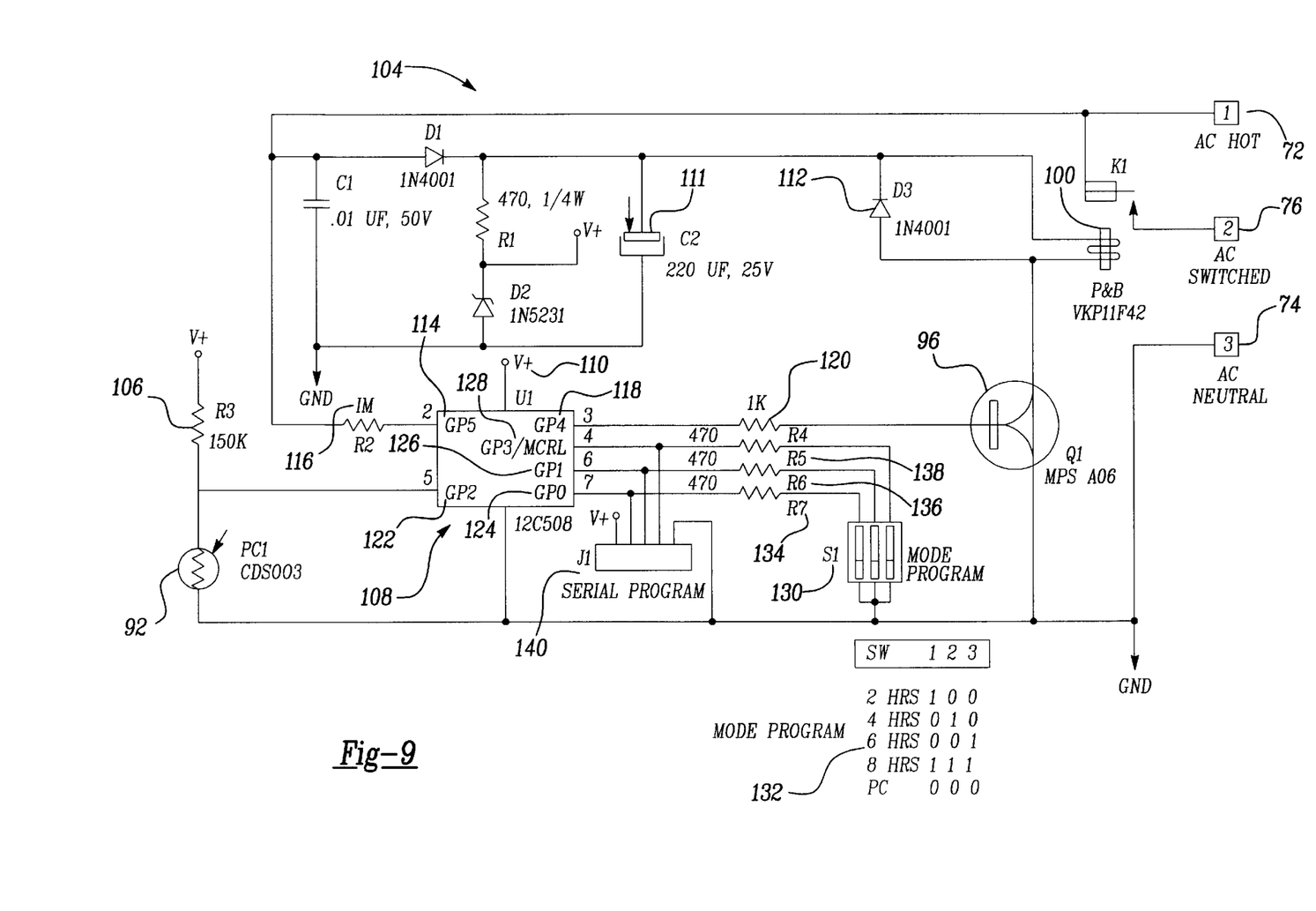
FIG. 9 is a schematic view of an optional timer control subsystem capable of interfacing with the control circuitry according to the present invention.

Referring now to FIG. 9, an optional timer circuit is illustrated at 104. The photocell element is again illustrated at 92 and is separated by the voltage input by a third resistor 106 (ideally set at 150 K-Ohm). The light sensor 92 communicates with a control integrated circuit 108 which has a schmitt trigger circuit built into input 122. The control integrated circuit 108 is powered by converting the unregulated DC voltage established by the power supply control circuit into a 5 V regulated DC supply, illustrated at 110. The power supply circuitry otherwise operates in the same manner illustrated in FIG. 8 with the further exception that a further capacitor 111 filters the half wave rectified AC and converts it to the unregulated DC. The unregulated DC is the potential needed to turn the relay 100 on and off and is fed to one side of the load relay coil. A diode 112 provides transient voltage protection to circuit 104.

The control integrated circuit 108 includes an input 114 which monitors a 60 Hertz AC frequency and utilizes this signal to generate an accurate time base. A second resistor 116 is inserted between the AC HOT terminal 72 and the input 114 to limit the current flow and to protect the integrated circuit 108. Output terminal 118 is connected to the output of the first transistor 96 and is separated by a resistor 120. The output of terminal 118 controls the load relay 100 which in turns the lights on and off via the base resistor 120 and first transistor 96. The resistor 120 limits the base current of the first transistor 96 that provides the drive current necessary to energize the load relay 100. Light and darkness levels are sensed by the photo sensor 92 and are fed into a further input 122 of the circuit 108 to provide a dead band into the circuit, much like the schmitt trigger previously described. The third resistor 106 is used to calibrate the amount of light needed to activate the input 122.

Inputs 124, 126 and 128 of the integrated circuit 108 sense a desired mode of operation of the unit 108 and can be programmed by the user via a switch 130 to effect up to eight different modes of operation. This is further referenced by mode programs 132 which are in effect timing selections for the period of running operation of the device such as 2 hours, 4, hours, 6 hours, 8 hours, etc. Additional resistors 134,136 and 138 are disposed between the switch 130 and the circuit inputs 124,126 and 128, respectively, and limit current and multiplex or share these inputs to allow the circuit to be serially programmed at the factory via a connector 140.

Figure 10:
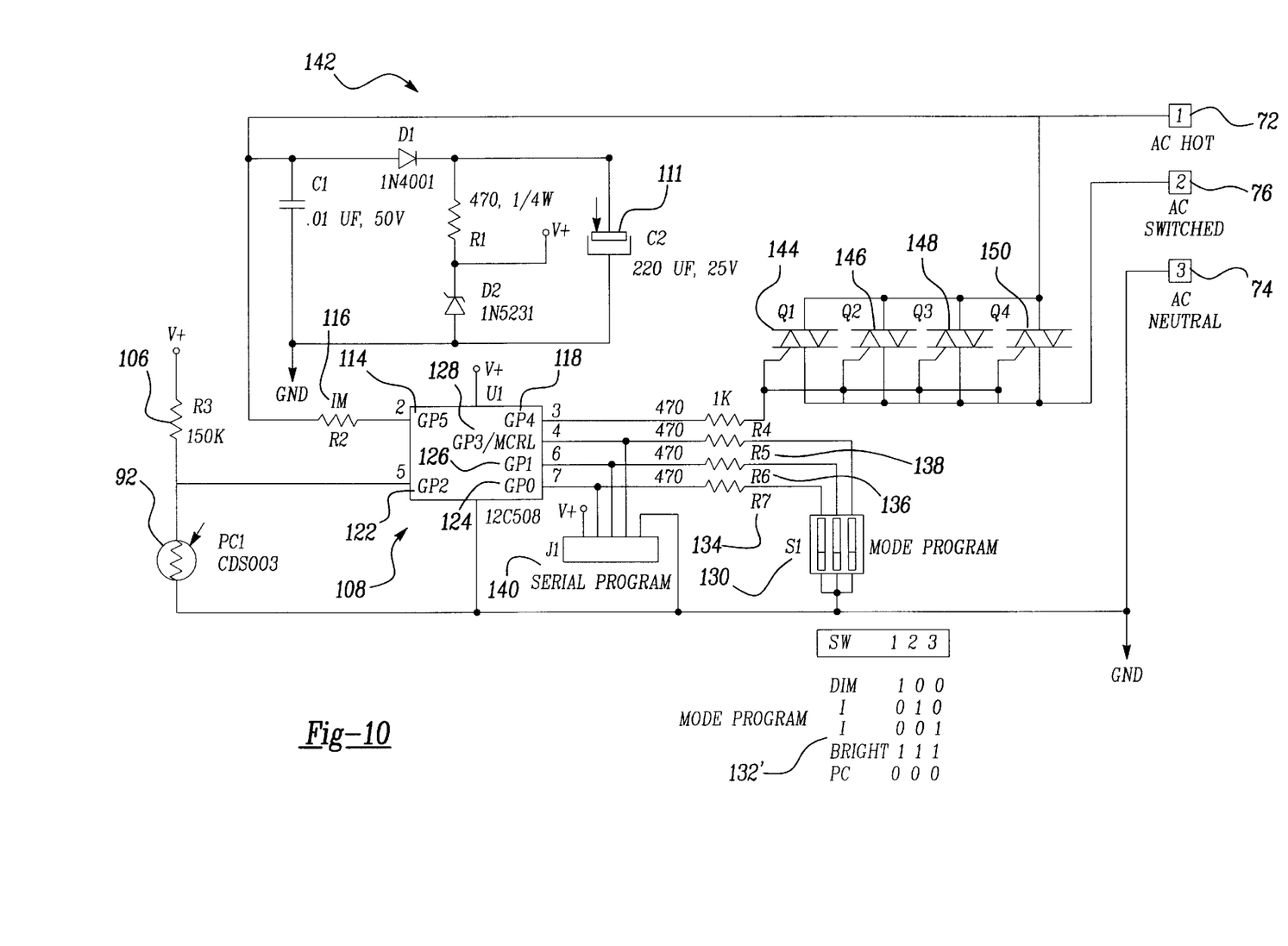
FIG. 10 is a schematic view of an optional dimmer control subsystem capable of interfacing with the control circuitry according to the present invention.

Closely related to the timer schematic of FIG. 9 is a further dimmer schematic of FIG. 10 illustrated at 142. The dimmer schematic represents many of the elements schematically described in the timer circuit of FIG. 9, and discussion will therefore be limited to the elements of the dimmer circuit. The control integrated circuit is again referenced at 108 and, in this instance, the output 118 controls the duty cycle to the gates of four 10 Amp triacs 144,146,148 and 150 which are connected in parallel and which provide a 40 Amp output to the load. Once again, inputs 124, 126 and 128 are again used to sense the desired modes of operation of the unit 108 and can be programmed by the user via switch 130. Illustrated at 132' is a further table of varying brightness levels associated with the dimness mode program. Connector 140 is again illustrated for enabling programming of the unit 108 at the factory.

Figure 11:
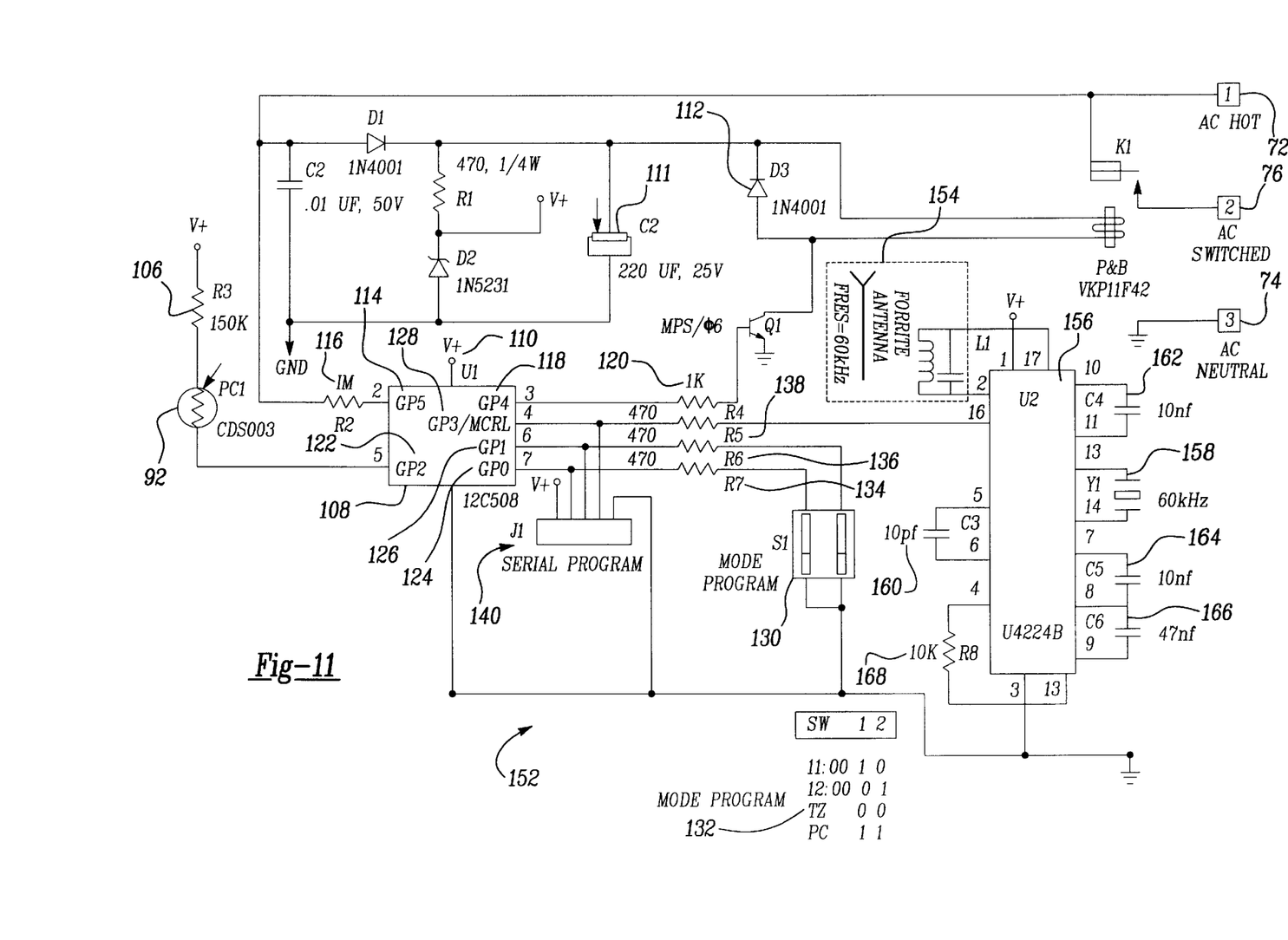
FIG. 11 is a schematic view of an optional real time broadcast receiver/timer circuit capable of interfacing with the control circuitry according to the present invention.

Referring finally to FIG. 11, a further variation of the present invention presents a schematic 152 illustrating a real time broadcast receiver/timer circuit for use with the basic control circuitry to a further preferred variant of the present invention. As with the timer and dimmer circuit schematics of FIGS. 9 and 10, the real time circuit of FIG. 11 largely represents the same elements and attention will therefore be limited to those which are unique to this feature.

Specifically, a ferrite rod antenna 154 is arrayed such that it is communicating with a further integrated circuit 156 capable of receiving and decoding an appropriate broadcast signal emanating from a remote source. In a preferred embodiment, the broadcast signal may be transmitted and originate from a location accessible to most or all parts of the United States. Such a transmitting location is ideally Boulder, Colo. where a 60 kHz broadcast signal is currently sent out. The decoded signal is serially fed to input 128 of the control integrated circuit 108 through the current limiting resistor 120. A quartz crystal 158 sets the receive frequency and capacitors 160,162,164,166 and resistor 168 adjust the gain, bandwidth, sensitivity and selectivity of the receiving circuit.

In addition to the capabilities previously described, the photocell device of the present invention can be programmed to turn on at dusk and off based upon a number of different factors including sunrise and sunset tables, the length of time the photocell is on or off, whether the days are getting longer or shorter, whether daylight savings time is in effect, the city or area of product installation so as to determine longitude and latitude, and the desired user designated off time. A suitable software algorithm (not shown) is programmed into the control unit to determine the amount of time the load is on to approximate the desired off time. Without knowledge of real time, the photocell device would control the desired off time of the load within a plus or minus of ¾ of an hour thus eliminating the need for most seasonal or real time adjustments.

Additional real time signaling inputs may also be provided by broadcast digital time codes transmitted via radio frequency from several different time and frequency stations including satellites. Since the remote photocell would always know real time (even after power outages) seasonal adjustments to the off time of the lighting load would never be required.

It is therefore evident that the photocell device of the present invention is a dramatic improvement over the limitations of prior lighting assemblies. The photocell device can be used with any new or existing lighting system and, due to its ability to connect to the output line of the transformer at a location remote from the transformer, enables greater flexibility of applications than previously made possible by the prior art.

Having described my invention, additional embodiments will become apparent to those skilled in the art to which it pertains without deviating from the scope of the appended claims:

I claim:

1. A photocell device for use with an exterior landscape lighting assembly, the lighting assembly including a transformer having an input line connected to an electrical power source and an output line connecting to a plurality of individual lighting units, the transformer converting the power source from a primary electrical winding through the input line to a secondary electrical winding through the output line, said photocell device comprising:

a turf stake capable of engaging into a ground location;

an enclosure unit mounted atop said turf stake, said enclosure unit including a power supply circuit, a photo sensor and control circuit means operatively communicating with said photo sensor;

an elongate and transparent rod extending upwardly from said enclosure unit, said rod serving as a light conduit to transmit ambient light to said photo sensor; and said photocell device electrically communicating with the output line at a point remote from the transformer and prior to a first of the plurality of individual lighting units, said power supply converting the secondary load to an unregulated and filtered direct current suitable for powering said control circuit means, said control circuit means selectively activating and deactivating the secondary electrical load to said plurality of individual lighting units.

2. A photocell device for use with an exterior landscape lighting assembly, the lighting assembly including a transformer having an input line connected to an electrical power source and an output line connecting to a plurality of individual lighting units, the transformer converting the power source from a primary electrical winding through the input line to a secondary electrical winding through the output line, said photocell device comprising:

a turf stake capable of engaging into a ground location;

an enclosure unit mounted atop said turf stake, said enclosure unit including a power supply circuit and a control circuit including software algorithmic means operatively communicating with said control circuit; and said photocell device electrically communicating with the output line at a point remote from the transformer and prior to a first of the plurality of individual lighting units, said power supply converting the transformer secondary winding to an unregulated and filtered direct current suitable for powering said control circuit means, said software algorithmic means approximating a real time signal input and in turn selectively activating and deactivating the secondary electrical load to said plurality of individual lighting units, a ferrite rod antenna receiving said real time signal input, said antenna communicating with a control integrated circuit for decoding said signal input, said signal input further including a broadcast signal.

3. The photocell device according to claim 1, further comprising the transformer output being provided at 12 V AC.

4. The photocell device according to claim 1, said control circuit means further comprising a light control circuit incorporating said photo sensor, a Schmitt trigger introducing a dead band into said light control circuit to prevent activation and deactivation of said secondary electrical load within specified parameters.

5. The photocell device according to claim 4, said control circuit means further comprising a dimmer circuit for establishing a degree of illumination of the lighting units.

6. The photocell device according to claim 4, said control circuit means further comprising a timer circuit for establishing an off time for deactivating the secondary electrical load to the lighting units.

* * * * *

UNITED STATES PATENT AND TRADEMARK OFFICE
CERTIFICATE OF CORRECTION

PATENT NO. : 5,962,982
DATED : October 5, 1999
INVENTOR(S) : Michael L. Mancuso

It is certified that error appears in the above-identified patent and that said Letters Patent is hereby corrected as shown below:

Column 1, line 30 - Delete "these".
Column 1, line 38 - Replace "and" with --which--.
Column 1, line 41 - Delete "is surrounded".
Column 1, line 42 - Insert --is located-- after "assembly".

Column 5, line 14 - Replace "100 and 102" with --99 and 101--.
Column 5, line 59 - Delete "in".

Signed and Sealed this

Sixth Day of March, 2001

Attest:

NICHOLAS P. GODICI

Attesting Officer

Acting Director of the United States Patent and Trademark Office